Oct. 7, 1952 J. K. McKELVEY 2,613,048
FISHING LINE OILING, GREASING, AND DRYING REEL
Filed Aug. 31, 1949 3 Sheets-Sheet 1
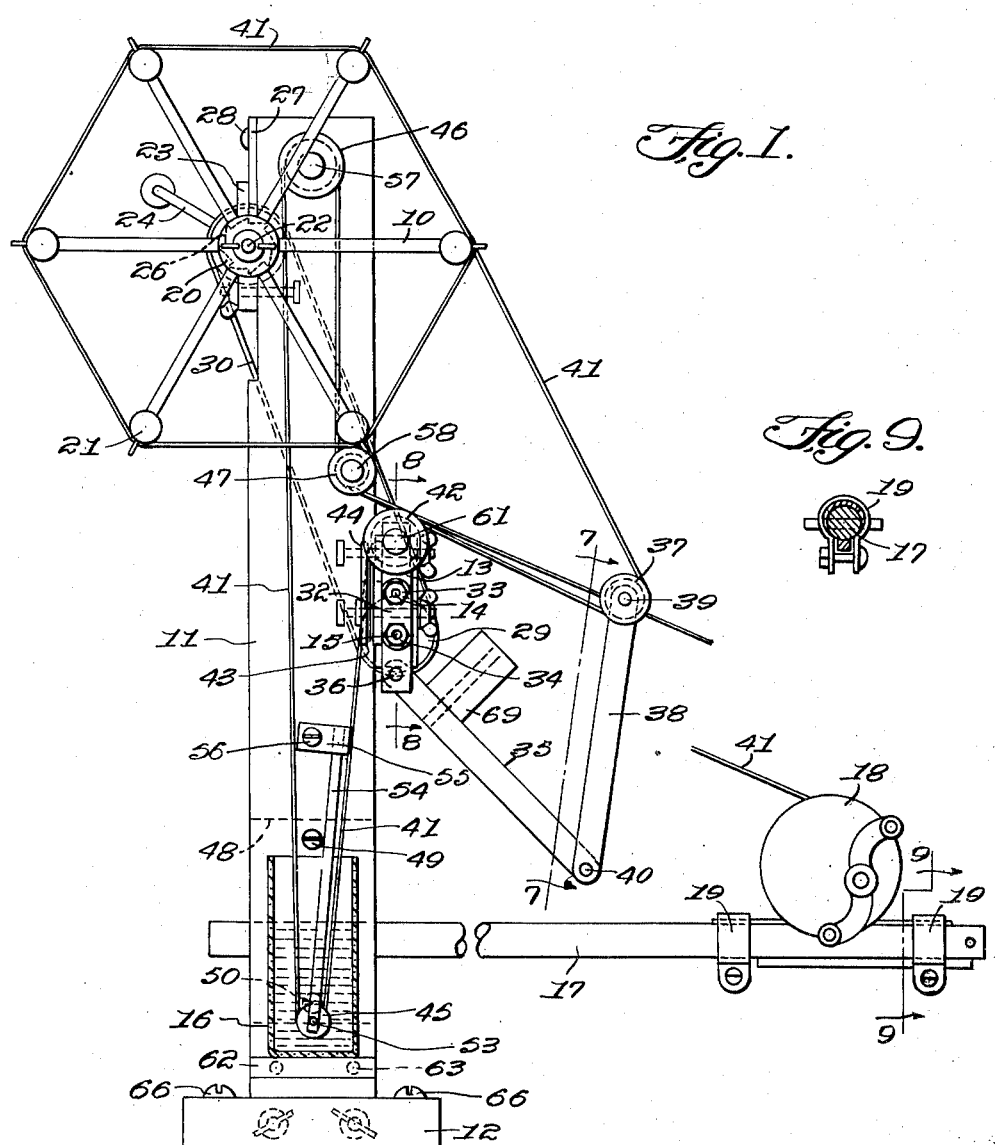
INVENTOR.
James K. McKelvey,
BY Victor J. Evans & Co.
ATTORNEYS

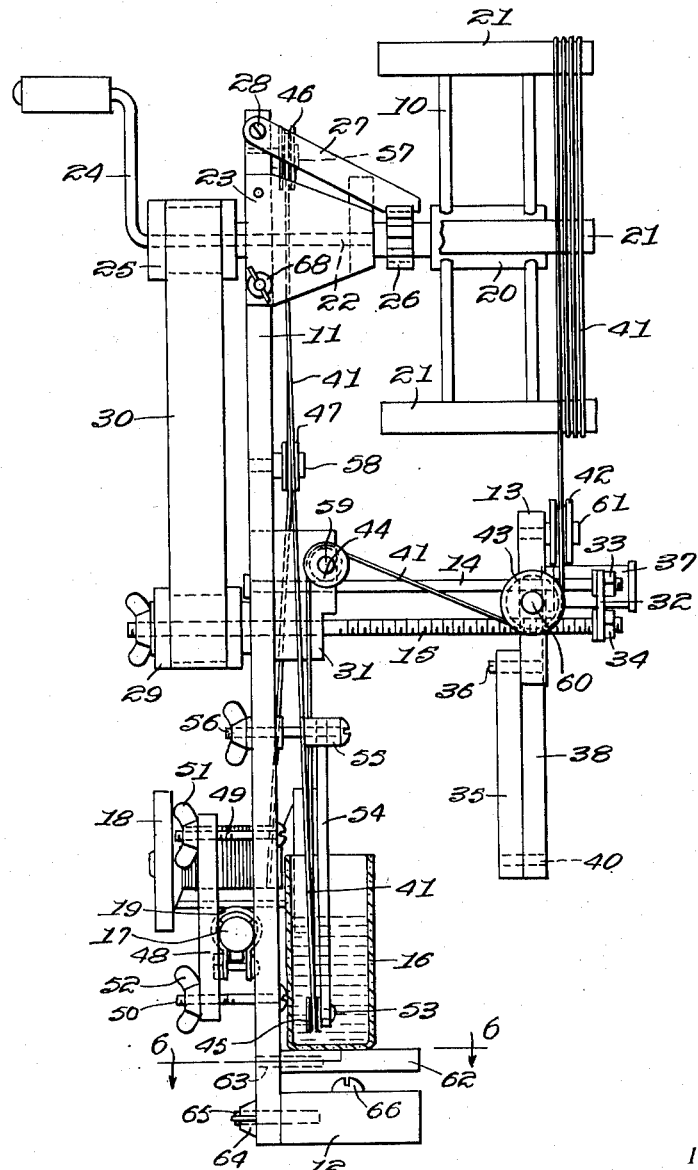

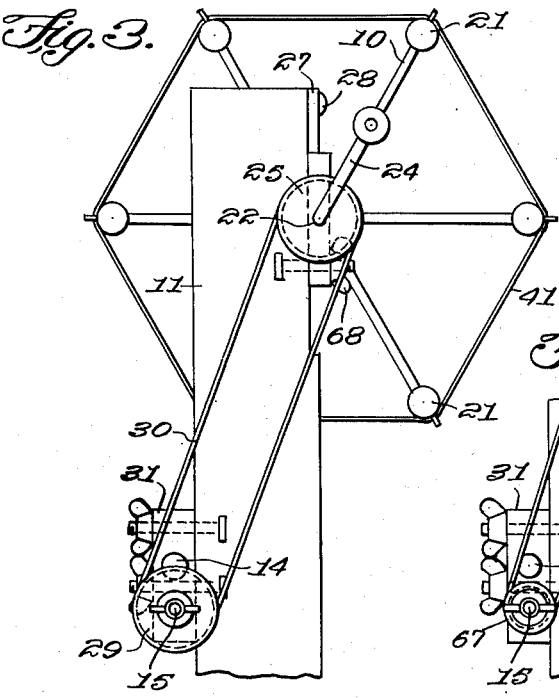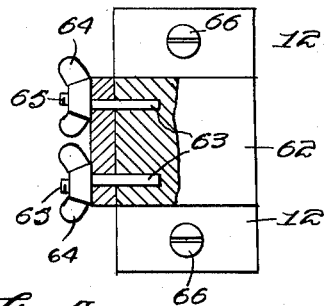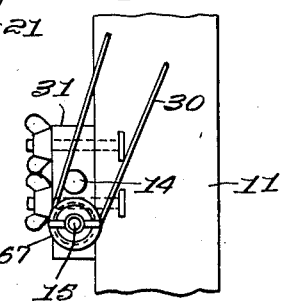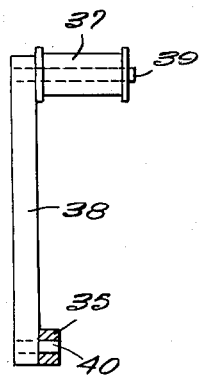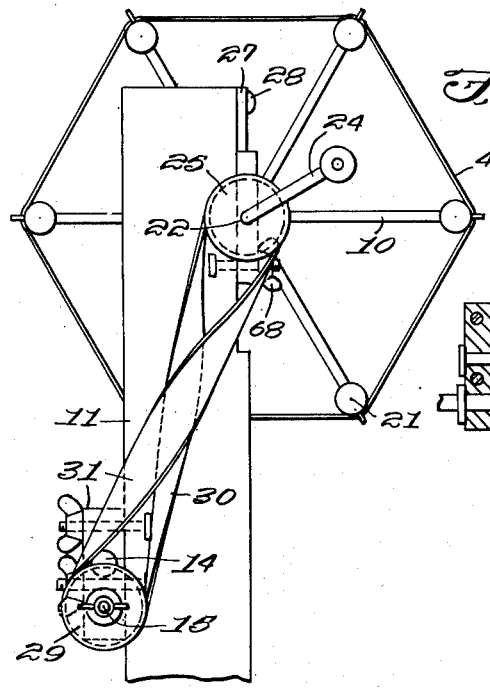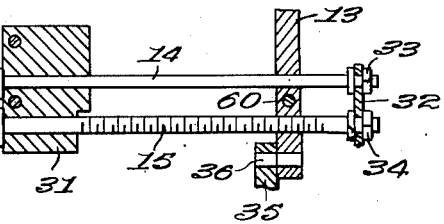

Patented Oct. 7, 1952

2,613,048

UNITED STATES PATENT OFFICE 2,613,048

FISHING LINE OILING, GREASING, AND DRYING REEL

James K. McKelvey, Massillon, Ohio

Application August 31, 1949, Serial No. 113,447

1 Claim. (Cl. 242—104)

This invention relates to temporary fishing line holding reels, and in particular a stand having means for mounting a fishing reel and a larger open reel with means for winding a fishing line from the fishing reel upon the open larger reel, or for winding the line back to the fishing reel, and also means for applying oil or grease to the line.

The purpose of this invention is to provide an improved drying rack or reel for fishing lines in which the lines may be fed to and wound upon a larger open wood reel through a level winder and wherein oil or grease may be applied to the line as it passes to or from the large reel.

Various attempts have been made to provide devices for conveniently removing fishing lines from reels for drying, oiling, and greasing but it has been found too difficult to change the line from one reel to another without danger of slack in the line or without tangling the line in rewinding. With this thought in mind this invention contemplates a comparatively simple stand with a large wood reel rotatably mounted upon an upright and with means for suspending a fishing reel from the upright so that a line therefrom may be fed through a level winder and other slack absorbing devices so that the line may be evenly wound upon the larger reel.

The object of this invention is, therefore, to provide means for mounting a fishing reel and a large wood reel with suitable line feeding devices on a small stand whereby a fishing line may be wound from the fishing reel upon the wood reel and also rewound upon the fishing reel.

Another object of the invention is to provide a fishing line oiling, greasing and drying device which is provided with a level winder and in which the level winder may be adjusted for lines of different sizes.

Another object of the invention is to provide a fishing line oiling, greasing and drying device that may also be used for putting a new line on a casting reel or for taking a line from a casting reel and winding it upon an empty line spool, and that may also be used for fly line drying or dressing.

A further object of the invention is to provide an improved fishing line oiling, greasing and drying device which is of a comparatively simple and economical construction.

With these and other objects and advantages in view the invention embodies a small stand formed with an upright and a base, a wood reel rotatably mounted on the upper end of the stand and having a crank by which it may be rotated, a level winder also rotatably mounted on the stand, positioned below the wood reel and having a belt by which it is rotated by the crank of the wood reel, a bottle positioned on the stand and through which the lines may be run, a rod having clamps for mounting a fishing reel, and suitable line feeding and pick up devices.

Other features and advantages of the invention will appear from the following description taken in connection with the drawings wherein:

Figure 1 is a side elevational view looking toward the end of the wood reel and level winder and showing a fluid container thereon in sections.

Figure 2 is an end elevational view looking toward the end of the stand opposite to that on which the fishing reel is mounted.

Figure 3 is a side elevational view showing the upper end of the stand with the lower part broken away, and looking toward the crank of the wood reel.

Figure 4 is a similar view showing the belt crossed whereby the reel rotates in the opposite direction with the crank turned in a clockwise direction.

Figure 5 is a detail showing the pulley at the lower end of the belt with the pulley shown in Figures 3 and 4 replaced by a smaller pulley such as may be used for a fly line drying or dressing device.

Figure 6 is a sectional plan taken on line 6—6 of Figure 2 showing the base of the stand and with part broken away showing the screws with the thumb nuts for supporting the shelf on which a fluid container may be placed.

Figure 7 is a detail taken on line 7—7 of Figure 1 showing the idler or slack take up pulley and supporting arm thereof.

Figure 8 is a cross section through the level winder taken on line 8—8 of Figure 1.

Figure 9 is a detail showing one of the clamps for holding the fishing reel on the rod and taken on line 9—9 of Figure 1.

Referring now to the drawings wherein like reference characters denote corresponding parts a fishing line oiling, greasing and drying reel of this invention includes a wood reel 10 rotatably mounted on an upright 11 of a stand having a base 12, a level winder including a carriage 13 mounted on a bar 14 and actuated by a screw 15, a container 16, and a rod 17 on which a fishing reel 18 is mounted by clamps 19.

The reel 10 includes radially disposed arms carried by a hub 20 and having transversely disposed line carrying bars 21 on the outer ends of the arms. The reel is mounted on a shaft 22 that is journaled in a bearing 23 on the upper end of the standard 11, and the extended end of the shaft is provided with a crank 24 with a pulley 25 on the shaft between the crank and standard. The inner side of the reel is provided with a ratchet wheel 26 and a ratchet 27 that is pivotally mounted on the standard by a screw 28 is positioned to engage the teeth of the ratchet wheel, as illustrated in Figure 2.

The pulley 25 on the reel shaft 22 drives a pulley 29 on the reel winder feed screw 15 through a belt 30, and the screw 15 is rotatably mounted in a block 31 on the standard. The supporting rod 14 is also mounted in the block 31 and the outer end thereof is connected to the feed screw 15 by a link 32 with lock nuts 33 and 34 clamping the end of the rod and screw to the link.

The carriage 13 is held in the upright position by the bar 14 and feed screw 15, and a bar or body member 35 having a weighted member 69 which is pivotally mounted on the carriage by a pin 36, extends downwardly from the carriage and supports an idler pulley 37 through an arm 38 on which the pulley is pivotally mounted by a pin 39, and which is pivotally attached to the end of the bar 35 by a pin 40.

A fishing line 41 extends from the reel 10, downwardly over the pulley 37, upwardly over the pulley 42 on the carriage 13, around the pulley 43 also on the carriage, over a pulley 44 on the block 31, downwardly around a pulley 45 in the container 16, upwardly over a pulley 46 on the upper end of the standard, and downwardly around a pulley 47, also mounted on the standard, and to the reel 18 on the outer end of the rod 17.

The rod 17 is clamped to the lower end of the standard by a plate 48 on screws 49 and 50 and the plate is held by thumb nuts 51 and 52 on the outer ends of the screws. The pulley 45 is pivotally mounted on a pin 53 in the lower end of an arm 54 that is pivotally mounted on the standard 11 by a bracket 55 and a screw 56. The pulley 46 is rotatably mounted on the standard by a pin 57 and the pulley 47 is mounted by a pin 58. The pulley 44 is pivotally mounted on the block 31 by a pin 59, and the pulley 43 is pivotally mounted on the carriage by a pin 60, and a pulley 42 is pivotally mounted on the carriage by a pin 61.

The container 16 is positioned on a shelf 62 that is secured to the standard by pin 63 and the standard is secured to the base 12 by thumb nuts 64 on screws 65. The base 12 may be secured to a table or other flat surface by screws 66, although it is preferred to use only one screw so that the standard may be turned to any convenient position.

When the device is used for fly line drying or dressing the lower pulley 29 is replaced by a smaller pulley 67, as shown in Figure 5 whereby the speed of the level winder travel is increased in relation to the revolutions of the spool or reel 10.

With the parts arranged in this manner a line from a fishing reel may readily be transferred to a large wood reel and before starting to wind the line on the wood reel the level winder carriage is run to either end of the travel and with the ratchet on the ratchet wheel the crank may be turned in a clockwise direction to wind the line on the wood reel. When one layer of line has been wound on the wood reel and there is more line to reel off, twist the belt to reverse the direction and keep turning the crank clockwise whereby the direction of travel of the carriage of the level winder is reversed. When all of the line is on the wood reel fasten the end of the line through the bracket held by the thumb nut 68 at the end of the reel.

The line may be oiled by running it through a bath of oil in the container 16, or grease may be applied to the line as it is reeled off of the fishing reel, step by step. The line may remain on the wood reel for drying.

In winding the line in either direction it may be desired to apply more tension to the line and for this reason a weight 69 may be mounted on the bar 35 of the take-up bracket.

It will be understood that other modifications may be made in the design and arrangement of the parts without departing from the spirit of the invention.

What is claimed is:

In an apparatus for handling a fishing line, a horizontally disposed base, a vertically disposed upright extending upwardly from said base and secured thereto, a first reel rotatably supported by said upright, a shaft supporting said reel on said upright, a block arranged contiguous to said upright and connected to said upright, a horizontally disposed bar extending from said block, a level winder including a carriage movably mounted on said bar, a screw member rotatably connected to said block for actuating said carriage, a horizontally disposed rod arranged above said base, means for detachably mounting a second reel on said rod, said first reel including a hub mounted on said shaft, a plurality of arms extending radially from said hub, a crank connected to an end of said shaft, a ratchet wheel connected to said first reel, a ratchet pivotally connected to said upright and mounted for movement into and out of engagement with said ratchet wheel, belt and pulley means connecting said shaft to said screw member, a link connecting said screw member and bar together, a body member pivotally connected to said carriage and depending downwardly therefrom, an arm extending from said body member, an idler pulley supported by said last named arm, a plate spaced from said upright and clamping said rod to said upright, a pair of pulleys rotatably supported by said upright, a pair of spaced pulleys rotatably connected to said carriage, and a pulley connected to said block, said pulleys and reels having the fishing line trained thereover.

JAMES K. McKELVEY.

REFERENCES CITED

The following references are of record in the file of this patent:

UNITED STATES PATENTS

| Number | Name | Date |
|---|---|---|
| 61,672 | Loughborough | Jan. 29, 1867 |
| 1,677,861 | Goodall | July 17, 1928 |
| 2,321,780 | Tondeur | June 15, 1943 |
| 2,438,135 | Schwartz et al. | Mar. 23, 1948 |

FOREIGN PATENTS

| Number | Country | Date |
|---|---|---|
| 124,920 | Great Britain | Apr. 10, 1919 |